UNITED STATES PATENT OFFICE.

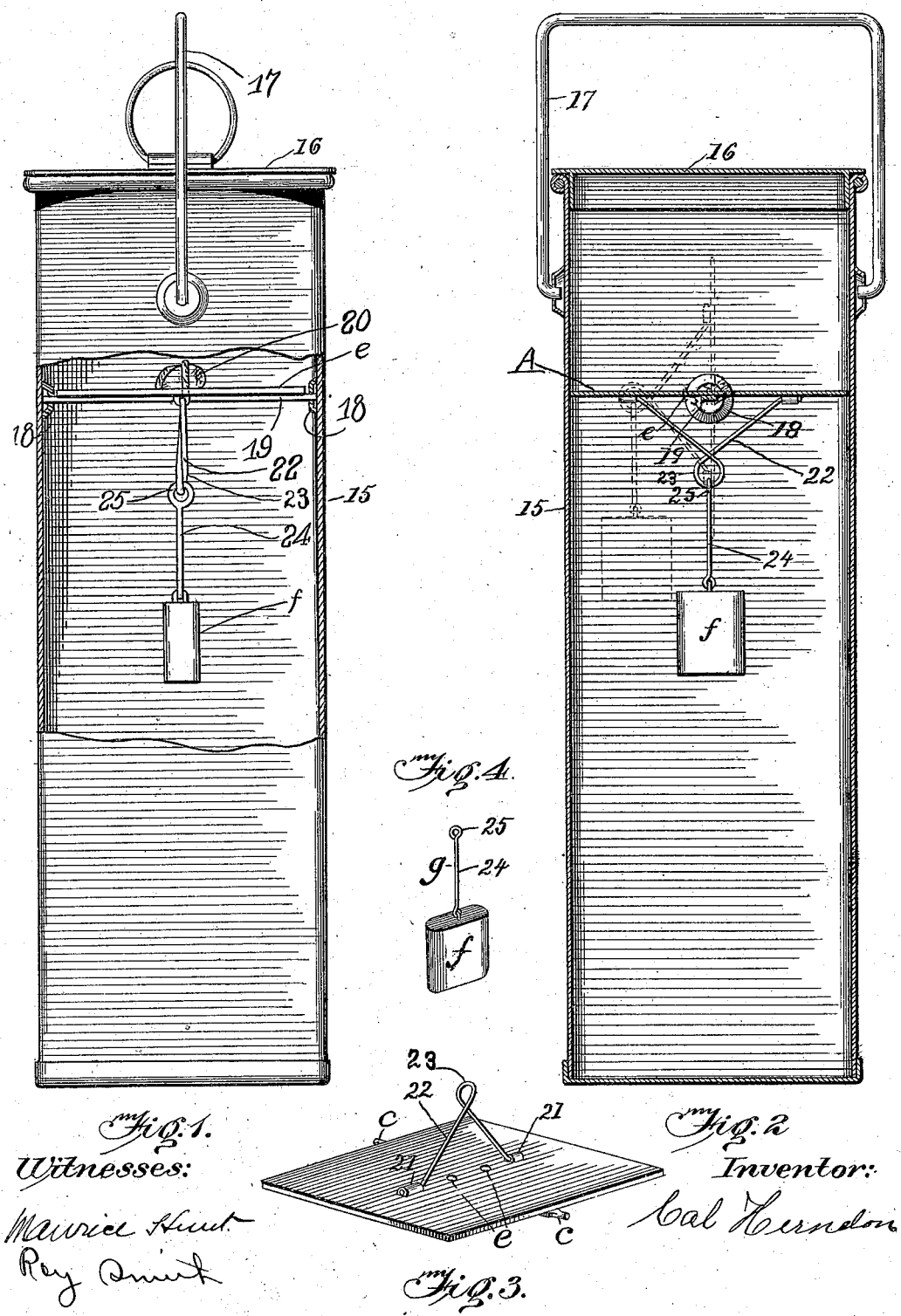

CALAWAY HERNDON, OF WAGONER, OKLAHOMA.

COMBINATION RAT-TRAP AND BUCKET.

No. 881,401.        Specification of Letters Patent.        Patented March 10, 1908.

Application filed June 14, 1907. Serial No. 379,070.

*To all whom it may concern:*

Be it known that I, CALAWAY HERNDON, a citizen of the United States, residing in the city of Wagoner, western district, Oklahoma, have invented a new and useful Improvement in a Combination Rat-Trap and Bucket, of which the following is a specification.

This invention relates to animal traps of the type which are generally known as self set or ever set; and it has for its object to provide a simple, inexpensive and efficient trap, including a receptacle which is capable of being used as a bucket, or as a packing or storage vessel, and a trap door pivotally supported in said bucket and equipped with a counterweight whereby said trap door shall be normally sustained in an approximately level or horizontal position, ready for operation.

Further objects of the invention are to simplify and improve the construction of the trap door, and the manner of connecting the counterweight therewith.

With these and other ends in view, which will readily appear as the nature of the invention is better understood, the same consists in the improved construction and novel arrangement and combination of parts which will be hereinafter fully described, and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to, when desired.

In the drawings—Figure 1 is a side elevation of a trap constructed in accordance with the invention. Fig. 2 is a vertical sectional view of the same. Fig. 3 is a perspective detail view, showing the trap door, detached, and in inverted position. Fig. 4 is a perspective detail view, showing the counter-weight, detached.

Corresponding parts in the several figures are denoted by like characters of reference.

15 designates a vessel or receptacle, which has been shown in the preferred form of an approximately rectangular bucket of sheet metal or other suitable material, the same being shown as provided with a lid, 16, and with a bail or handle, 17. It is obvious, that when the device is to be utilized as a trap, the lid is to be removed therefrom.

The bucket or vessel is provided with interiorly arranged, oppositely disposed bosses, 18, located on diametrically opposite sides of the side-walls, and affording bearings for the trunnions, $c\ c$, formed by the projecting ends of a cross-bar, 19, which extends transversely across the trap-door, A, which is fitted in the vessel or bucket in such a manner as to be capable of turning or rotating freely upon its axis within said bucket. The trap-door is provided with apertures, $e\ e$, for the passage of a cord or wire, whereby bait may be secured in position upon the trap-door, as indicated at 20 in Fig. 2 of the drawings.

The trap-door is provided upon its under side with bearings, 21, for the terminal ends of a wire bail, 22, having a terminal loop, 23; a suitable pendulum or counter-weight, $f$, is provided having a suspending rod, 24, provided with a terminal hook or eye, 25, whereby it is connected with the loop $d$ of the pivoted bail 22.

The parts or members of the improved trap may be very readily assembled by simply suspending the counter-weight or pendulum from the bail 22, and then placing the trunnions $c\ c$ of the trap-door in their bearings, thus supporting the said trap-door in position for operation; it being held or retained in an approximately horizontal position by the counter-weight, but in such a manner that it will be perfectly free to turn upon its axis. The trap door will thus form a horizontal partition in the bucket or receptacle, and bait may be placed thereupon, as indicated, to lure the victims. When an animal enters the trap, attracted by the bait, the weight of such animal upon the trap-door will unfailingly cause the latter to turn upon its axis, thus causing the victim to drop into what may be termed the receiving compartment in the bottom of the bucket or receptacle. It will be observed, that the bail 22 which supports the counter-weight is necessarily disposed approximately at right angles to the axis of rotation of the trap-door, in order that the weight may be effective to restore the trap-door to its normal or initial position after having been tilted under the impulse of the strain of the weight of the victim. Now, in order that sufficient leverage may be obtained to render the operation efficient while using a moderately light counter-weight, it is desirable that the suspending members, namely the bail 22 and the rod 24 may be made of considerable length; if these members were made rigid, there would be considerable danger of the counter-weight striking the side-walls of the bucket or receptacle, thus interfering with the rotation of the trap-door, and thus defeating the purpose of the invention. By mounting the bail 22 pivotally in its bearings, and loosely connecting the suspending member 24 with said bail, the counter-weight will be free to swing transversely to the movement of the trap-door, when the latter turns upon its axis, and the operation of the device will be rendered certain and effective.

The trap-door with its related parts may be very readily removed from the vessel or receptacle, when desired, and said vessel may then be utilized as a bucket, or for packing or storage purposes. The pivoted supporting bail 22 may be swung or folded flatly against the body of the trap-door, thus facilitating the packing of the device in small compass.

The general construction of the device is simple, inexpensive, and thoroughly efficient for the purposes for which it is provided.

Having thus described my invention, I claim and desire to secure by Letters Patent of the United States:

1. An animal trap comprising a receptacle such as a bucket having bearings disposed interiorly upon the side-walls thereof, in combination with a trap-door having a cross-bar with projecting ends forming trunnions, and a weight-supporting bail pivotally connected with the trap-door and moving in a plane perpendicular to the axis of rotation of the trap-door.

2. In an animal trap, the combination with a vessel constituting a receptacle, of a trap door pivotally supported in said receptacle, a bail pivoted upon the under side of the trap-door transversely to the axis of rotation of said door, and a pendulum-weight having a suspending rod connected with the bail.

In testimony that I claim the foregoing as my own, I have hereto subscribed my name in the presence of two witnesses.

CALAWAY HERNDON.

Witnesses:
 C. C. Palmer,
 J. A. Crowder.